H. Barringer,
Upsetting Tires,
N°. 15,272.    Patented July 8, 1856.
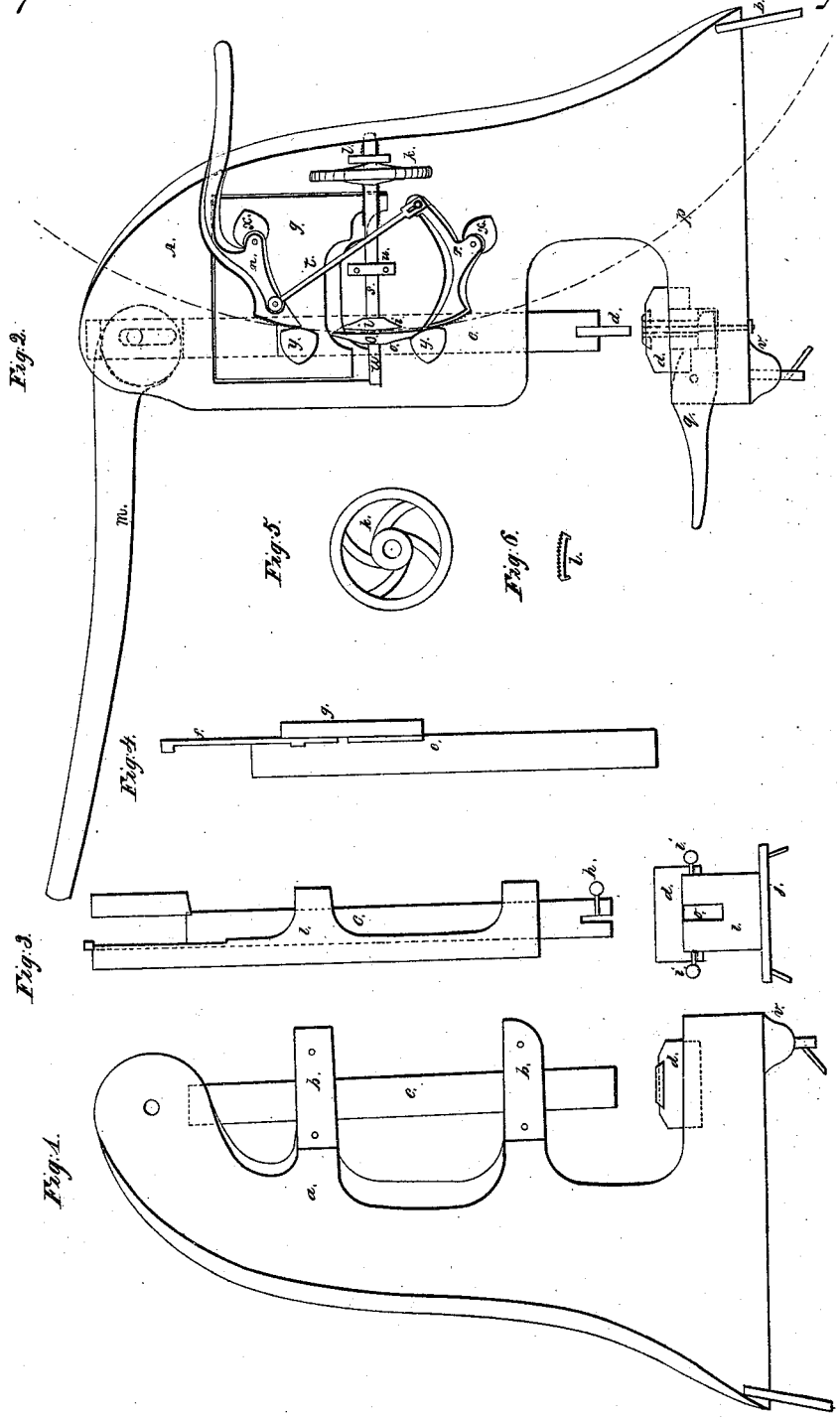

UNITED STATES PATENT OFFICE.

HENRY BARRINGER, OF BARRY, ILLINOIS.

MACHINE FOR UPSETTING TIRES.

Specification of Letters Patent No. 15,272, dated July 8, 1856.

*To all whom it may concern:*

Be it known that I, HENRY BARRINGER, of Barry, in the county of Pike and the State of Illinois, have invented certain new and useful Improvements in Machines for Shrinking Wagon-Tires; and I do hereby declare that the following is a full, clear, and exact description of the same, reference being had to the accompanying drawings, and to the letters marked thereon, in which—

Figure 1 is an illustration of the upright stationary frame. Fig. 2 is a side illustration of my machine. Figs. 3, 4, 5, and 6 are detached views of different parts.

Like letters refer to like parts in the different figures.

The nature of my invention covers in operating the clamping levers of my machine simultaneously by the combined action of a slotted connecting lever or bar, so as to allow the clamping levers to be pressed together without unclamping them.

To enable others skilled in the art to make and use my invention I will proceed to describe its construction and operation.

"A" represents a metallic plate of a suitable size and form as seen in Figs. 1 and 2. "$g$" represents another plate of the form seen in Figs. 2 and 4, which is secured firmly to and slides or moves with bar $c$. Said bar moves in a vertical direction and is operated by an eccentric lever, as seen at Fig. 2, and is attached to said eccentric by means of a bracket $f$, which hooks over the top of the eccentric, while the under side of the eccentric acts directly on the upper end of bar "$c$." Said eccentric is supported in suitable bearings so that when the lever is raised or lowered it raises and lowers the bar "$c$" and "$g$," which is secured firmly to said bar.

"$n$" and "$r$" are clamping levers having bearings at $x$, $x$, and of the form seen in Fig. 2.

"$y, y$," are bearings against which the tire to be shrunk is placed and pressed for the purpose of clamping with the levers "$n$" and "$r$," as seen in the drawings, Fig. 2.

"$t$" is a slotted lever or bar which connects the clamping levers "$n$" and "$r$;" it is secured to the short arm of lever "$n$" so as to work freely and secure it firmly in its position. The bar is provided with a short slot in which a pin on lever "$r$" works, and at the same time secures that end of the bar permanently to the outer end of lever "$r$," as seen in Fig. 2. The slot must be just as long as the required distance which plate "$g$" has to move in the operation of upsetting the tire.

The arm of lever "$n$" to which the bar is attached must be equal in length to the arm of lever $r$ to which said bar is attached, so that the bearings of said lever $r$ are equidistant from either end of the lever.

"$o$" is a stationary bearing plate against which the tire rests.

"$i$" is a sliding plate which is operated by means of a screw, and is used for the purpose of pressing the tire against the plate "$o$" for the purpose of preventing the iron from kinking.

The operation of my machine is as follows: The tire being heated sufficiently for the operation the operator raises the lever "$m$" so as to raise the sliding plate "$g$," to its proper height, as seen in Fig. 2. Then the outer end of clamp lever, "$n$," which is secured to and moves with plate "$g$," is raised up. This operation throws the inner end of said lever down and carries the clamping surface of said lever from the bearing "$y$," and leaves a sufficient space between it and said plate to receive the tire. It also carries the bar with it and thereby forces down the outer end of lever "$p$" which is secured to the frame and raises up, and carries the clamping surface of said bar away from the opposite bearing $y$, a distance equal to that of lever "$n$." The sliding clamp is also drawn back sufficiently to receive the tire, which is now placed in the machine, (Fig. 2,) letter "$p$." Then the outer end of lever "$n$," is forced down which raises the inner end of said lever and forces its clamping surface against the tire, which is supported by bearing "$y$," directly opposite, while bar "$t$," acts upon lever "$r$" and operates it in like manner. Then the sliding clamp "$i$" is also forced against the tire and prevents it from bending or kinking. When this is done the lever "$m$" is forced down, which operates the eccentrics, and said eccentric acting upon the sliding bar "$c$," and the plate "$g$" forces it down vertically, and carries the clamping lever and bearings with it. Since lever and bearing "$g$," clamp the iron firmly and presses it endwise, "or upsets it," as much as required. Now were it not for the slot in the lower end of the bar, "t," when the plate "q," is pressed down it would unclamp the lever "r," and relieve the lower end of the iron, and prevent its being upset, but the slot in said bar gives sufficient room for plate "g" and clamp "n" to come down a sufficient distance to do the desired work without in any way affecting the position of the clamping levers. When the iron has been upset the slot has slid down so that the upper end of it comes in contact with the pin. Then by raising lever "n," up at the outer end, said bar is forced down and carries the outer end of the lever "r" down with it this operation relieves the iron which may be removed.

The most important advantage gained by this apparatus over all others is the great facility with which the operator can handle the machine, the two clamping dogs acting simultaneously from one motion of one lever which operation is not presented in any machine now in use. The operator can secure the apparatus to the tire much sooner and more effectually than any other machine, and thus avail himself of the heat which has previously been obtained which is necessary to be acted upon as soon as possible after being taken.

I am aware that iron has been upset by clamping it in different ways and then pressing it together, but I know of no apparatus whereby the iron can be clamped and unclamped by a single motion of one lever, as described. Therefore I do not claim clamping iron for the purpose of forcing the clamps together and thereby upset said iron, but What I do claim as my invention and desire to secure by Letters Patent is—

The combination of the slotted bar "t," the clamping lever "n" and sliding plate "g," with the clamping lever "r," for the purpose of clamping and unclamping the tire with one motion of lever "n" the whole being arranged and constructed as described.

HENRY BARRINGER.

Attest:
NOAH LINTHICUM,
S. F. SPAULDING.